United States Patent
Zhang et al.

(10) Patent No.: US 11,431,724 B2
(45) Date of Patent: Aug. 30, 2022

(54) SHARED ELECTRONIC DEVICE MANAGEMENT DEVICE AND METHOD

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Bo Zhang, Shenzhen (CN); Tao Zhao, Zhengzhou (CN); Lin Liu, Zhengzhou (CN); Xiao-Nan Zhu, Zhengzhou (CN); Jian-Guo Chan, Zhengzhou (CN); Shao-Bing Hou, Zhengzhou (CN); Zhi-Li Su, Zhengzhou (CN); Xiang Ru, Wuhan (CN); Zhi-Ping Zhang, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 287 days.

(21) Appl. No.: 16/733,980

(22) Filed: Jan. 3, 2020

(65) Prior Publication Data
US 2021/0058405 A1 Feb. 25, 2021

(30) Foreign Application Priority Data
Aug. 21, 2019 (CN) .......................... 201910775254.3

(51) Int. Cl.
*H04L 9/40* (2022.01)

(52) U.S. Cl.
CPC .......... *H04L 63/12* (2013.01); *H04L 63/0428* (2013.01); *H04L 2209/60* (2013.01)

(58) Field of Classification Search
CPC . H04L 63/12; H04L 63/0876; H04L 63/0861; G06F 21/31; G06F 21/32; G06Q 10/20; G06Q 30/0645
See application file for complete search history.

(56) References Cited

U.S. PATENT DOCUMENTS

| | | | |
|---|---|---|---|
| 10,671,986 B2* | 6/2020 | Yen | H04W 4/24 |
| 2003/0212709 A1* | 11/2003 | De Schrijver | G07C 9/38 |
| 2007/0084876 A1* | 4/2007 | Ardern | G07F 11/163 |
| | | | 221/258 |

(Continued)

*Primary Examiner* — Robert B Leung
(74) *Attorney, Agent, or Firm* — ScienBiziP, P.C.

(57) ABSTRACT

A shared electronic device management method is implemented in a shared electronic device management device. The method includes receiving a function instruction, obtaining verification information, linking the obtained verification information to verification information in a database, determining whether the obtained verification information meets a first preset condition, implementing the function instruction if the obtained verification information meets the first preset condition, and outputting a prompt if the obtained verification information does not meet the first preset condition. The function instruction includes any one of retrieving, depositing, and repairing a shared electronic device. The verification information includes user verification information and shared electronic device verification information.

10 Claims, 6 Drawing Sheets

(56) References Cited

U.S. PATENT DOCUMENTS

| | | | | |
|---|---|---|---|---|
| 2013/0157641 A1* | 6/2013 | Brahami | .................... | G07F 7/06 |
| | | | | 455/418 |
| 2014/0128023 A1* | 5/2014 | Guerra | ............... | G06Q 30/0645 |
| | | | | 455/406 |
| 2014/0368156 A1* | 12/2014 | Aloe | .................. | H02J 7/00047 |
| | | | | 320/106 |
| 2015/0145642 A1* | 5/2015 | Rutledge | ................ | G06Q 10/20 |
| | | | | 340/5.51 |
| 2016/0099590 A1* | 4/2016 | Velderman | ................ | G07F 7/06 |
| | | | | 320/113 |
| 2017/0256119 A1* | 9/2017 | Abdelmalak | ............. | G07F 7/06 |
| 2017/0337622 A1* | 11/2017 | Denais | .................. | G06Q 20/34 |

* cited by examiner

SHARED ELECTRONIC DEVICE MANAGEMENT DEVICE AND METHOD

FIELD

The subject matter herein generally relates to shared electronic device management, and more particularly to a shared electronic device management device and a method using the same.

BACKGROUND

In today's high-tech companies, due to concerns of confidentiality, employees are prohibited from using personal mobile phones inside the company. Employees or suppliers may use shared electronic devices set up inside the company. A device and a method to manage the shared electronic devices are needed.

BRIEF DESCRIPTION OF THE DRAWINGS

Implementations of the present disclosure will now be described, by way of embodiments, with reference to the attached figures.

DETAILED DESCRIPTION

Figure 1:
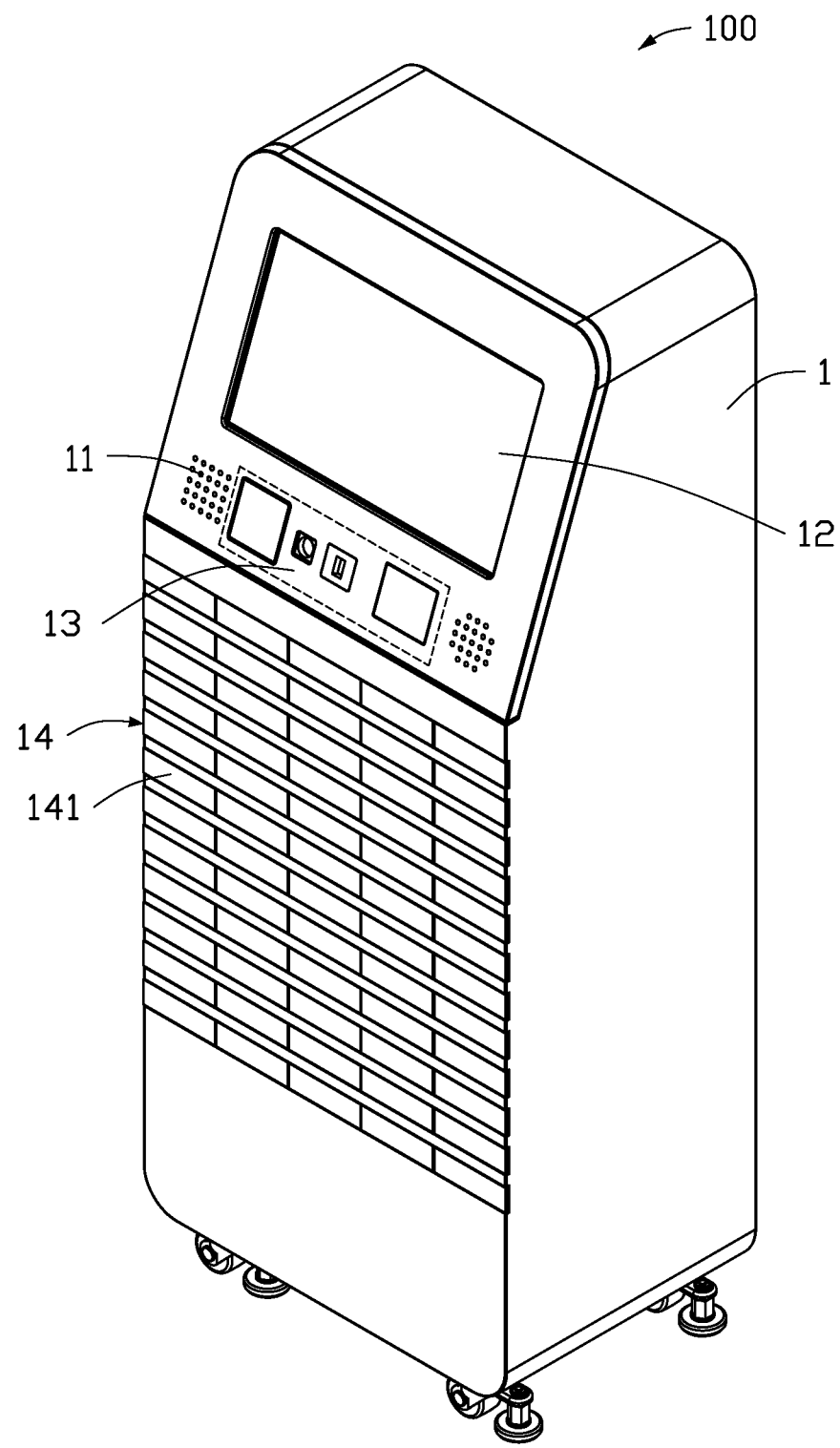
FIG. 1 is an assembled, isometric view of an embodiment of a shared electronic device management device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of a shared electronic device management device 100. The shared electronic device management device 100 includes a chassis 1, an input unit 11, an output unit 12, an acquisition unit 13, and a storage unit 14. In one embodiment, the input unit 11 is a keyboard, and the output unit 12 is one or more of a display device with a touch input function or a speaker.

The input unit 11 is for obtaining a function instruction inputted by a user through the keyboard, and the function instruction can also be input through the touch input device. The function instruction includes any one of retrieving, depositing, and repairing a shared electronic device.

The output unit 12 is configured to display a response result of the function instruction, and also configured to display usage information of the shared electronic device in the electronic device management apparatus 100. The usage information includes a number of remaining electronic devices in the shared electronic device management device 100, a remaining number of storage compartments for storing the shared electronic devices, data of faulty electronic devices, and so on.

The acquisition unit 13 is configured to collect user verification information and a serial number of the shared electronic device. In one embodiment, the acquisition unit 13 may include at least one of a camera, a document scanner, a biometric unit, and a physical input device. The biometric unit includes at least one of a fingerprint recognition device, an iris recognition device, and a voiceprint recognition device. The physical input device can be a keyboard, or a touch panel.

The storage unit 14 includes a plurality of storage compartments 141 for storing the shared electronic devices.

The shared electronic device includes, but is not limited to, a smart phone, a tablet, a smart wearable watch, AR glasses, a mobile power source, and the like.

Figure 2:
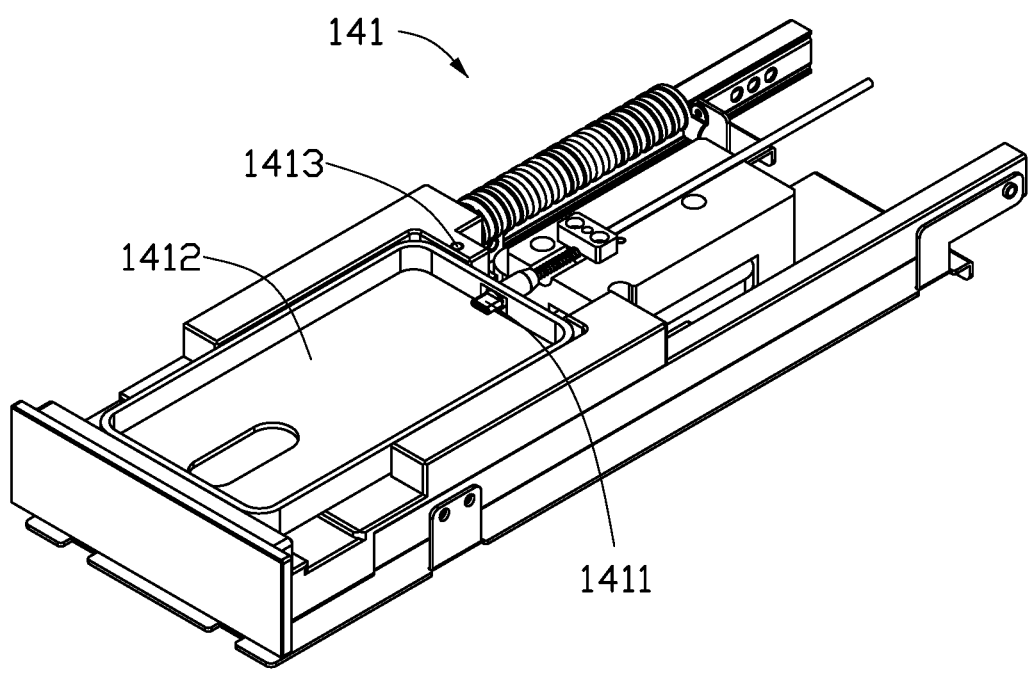
FIG. 2 is an isometric view of a storage compartment of the shared electronic device management device in FIG. 1.

FIG. 2 shows an embodiment of a storage compartment 141 for placing a shared electronic device in the shared electronic device management device 100. The storage compartment 141 includes a data charging interface 1411, a fixing plate 1412, and a sensing unit 1413. The data charging interface 1411 is configured to charge the electronic device, receive a detection instruction sent by the shared electronic device management device 100, and send a response to the detection instruction to the shared electronic device management device 100. The shared electronic device is placed on the fixing plate 1412. The sensing unit 1413 is located adjacent to the fixing plate 1412 inside the storage compartment 141 for sensing a state of occupancy of the storage compartment 141. In one embodiment, the sensing unit 1413 may be an infrared sensor, and the infrared sensor is located at one end of the fixing plate 1412 for sensing whether the shared electronic device is located on the fixing plate 1412. In another embodiment, the sensing unit 1413 may be a pressure sensor located in a placement area of the fixing plate 1412 for sensing whether the shared electronic device is located on the fixing plate 1412.

Figure 3:
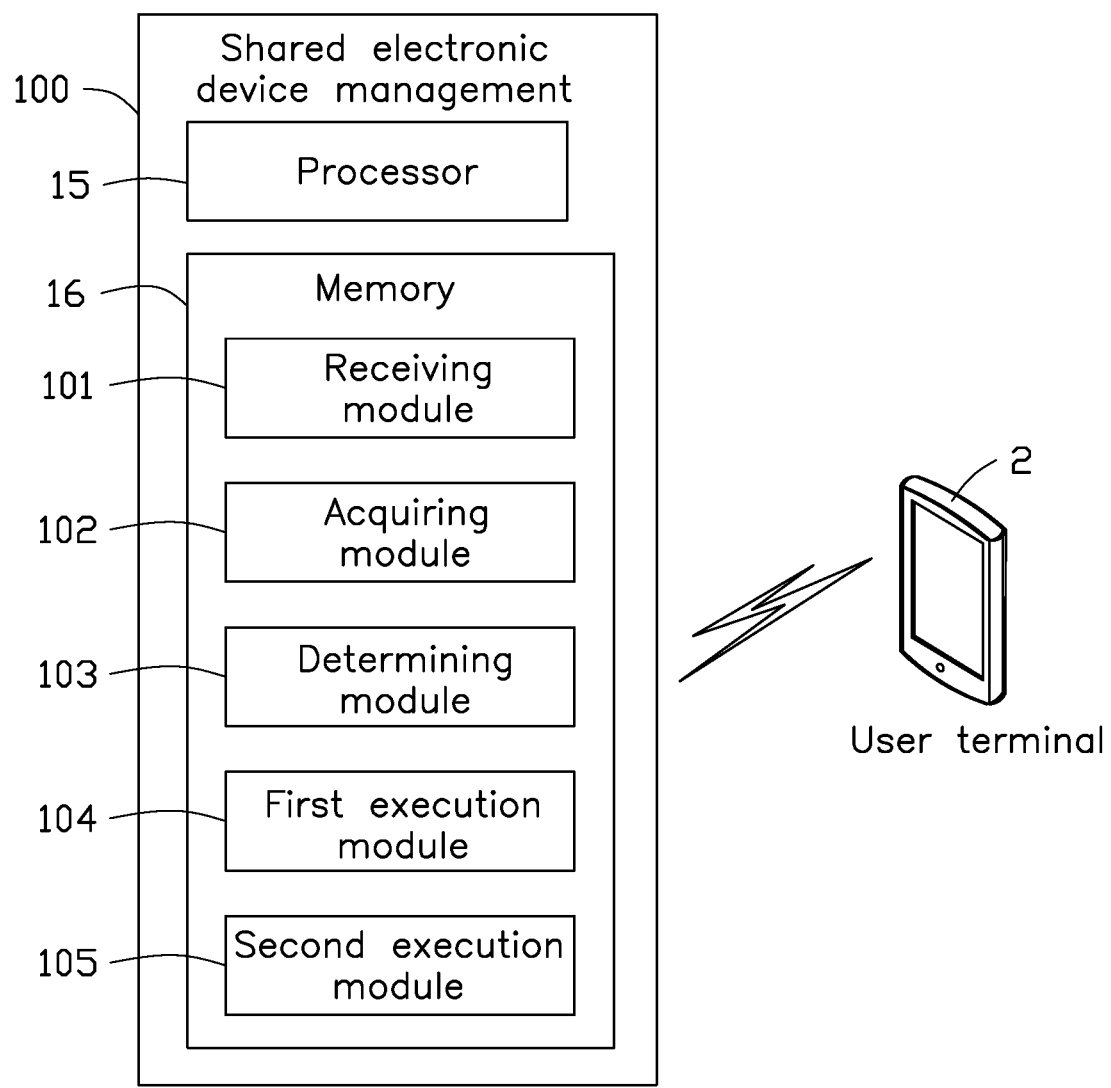
FIG. 3 is a schematic function module diagram of the shared electronic device management device.

FIG. 3 shows a function module diagram of the shared electronic device management device 100. The shared electronic device management device 100 establishes a communication connection with at least one user terminal 2 through a network. The network may be a wired network or a wireless network, such as radio, Wireless Fidelity (WIFI), cellular, satellite, broadcast, and the like. The user terminal 2 receives the detection result of the shared electronic device transmitted by the shared electronic device management device 100. The user terminal 2 may be, but is not limited to, a smartphone, a tablet computer, a laptop computer, a desktop computer, and the like. The shared electronic device management device 100 further includes a processor 15 and a memory 16.

The processor 15 is configured to execute computer program instructions. The processor 15 may be a central processing unit (CPU), or may be another general-purpose processor or a digital signal processor (DSP), Application Specific Integrated Circuit (ASIC), Field-Programmable Gate Array (FPGA), or other programmable logic device, discrete gate or transistor logic device, discrete hardware component, or the like. The general purpose processor 15 may be a microprocessor or may be any conventional processor in the art. The processor 15 is a control center of the shared electronic device management device 100 and is connected by various interfaces and lines.

The memory 16 can be used to store a computer program and/or modules. By executing the computer program and/or modules stored in the memory 16 and recalling data stored in the memory 16, various functions of the shared electronic device management device 100 are implemented. In addition, the memory 16 may include a high-speed random access memory, and may also include a non-volatile memory such as a hard disk, a memory, a plug-in hard disk, a smart memory card (SMC), a secure digital card, a flash card, at least one disk storage device, a flash device, or other volatile solid state storage device. The computer program can be partitioned into one or more modules, the one or more modules being stored in the memory 16 and executed by the processor 15. The one or more modules may be a series of computer program instruction segments capable of performing a particular function, the instruction segments being used to describe the execution of the computer program in the shared electronic device management device 100. For example, the computer program can be divided into a receiving module 101, an acquiring module 102, a determining module 103, a first execution module 104, and a second execution module 105.

The receiving module 101 is configured to receive a function instruction input by a user through the input unit 11. The function instruction includes any one of retrieving the shared electronic device, depositing the shared electronic device, and repairing the shared electronic device.

The acquiring module 102 is configured to obtain verification information from the acquisition unit 13, wherein the verification information includes user verification information and shared electronic device verification information.

The user verification information includes at least one of biometric information and user personal identification information. The biometric information includes at least one of facial information, fingerprint information, iris information, and voiceprint information.

The shared electronic device verification information may be a serial number of the shared electronic device.

A method for obtaining user verification information by the acquisition unit 13 includes one or more of the following. User personal identification information is acquired by a camera, a document scanner, or a physical input unit provided on the shared electronic device management device 100. At least one of the user's facial information, fingerprint information, iris information, and voiceprint information is acquired by a camera or a biometric unit provided on the shared electronic device management device 100.

In another embodiment, when the shared electronic device management device 100 receives the function instruction for retrieving, the user verification information is acquired by the acquisition unit 13.

In another embodiment, when the shared electronic device management device 100 receives the function instruction for depositing or repairing the shared electronic device, the serial number of the shared electronic device is acquired by the acquisition unit 13. In one embodiment, the acquisition unit 13 is a camera of the shared electronic device management device 100 for acquiring a QR code of the shared electronic device adhered on a surface of the shared electronic device or an electronic QR code located within the shared electronic device. The acquiring module 102 receives QR code information obtained from the acquisition unit 13.

The determining module 103 is configured to compare the obtained verification information with user verification information in a database and determine whether the verification information conforms to a first preset rule.

In one embodiment, the database is configured to store the user verification information and shared electronic device verification information.

The user verification information stored in the database is obtained by receiving biometric information of the user, or by scanning an ID card of the user by a scanning unit.

The shared electronic device verification information stored in the database is obtained by scanning the serial number of the shared electronic device.

When the user verification information is the facial information, the determining module 103 uses a facial recognition model to identify facial information of the user and compare the facial information of the user to the facial information in the database. The facial recognition model may be based on a convolutional neural network, and facial feature information of the face is obtained and compared to the facial feature information in the database to determine whether the facial feature information exists in the database.

When the user verification information acquired by the collection module 102 is fingerprint information, the determining module 103 uses the fingerprint identification model to identify the fingerprint information of the user and compares the fingerprint information to the fingerprint information in the database. The fingerprint recognition model uses optical fingerprint recognition to irradiate light onto the fingerprint through the biometric unit and obtains the texture of the fingerprint through the reflected light receiver. The texture of the fingerprint is compared to the fingerprint pattern in the database to determine whether the fingerprint information exists in the database.

When the user verification information acquired by the acquiring module 102 is iris information, the determining module 103 uses the iris recognition model to identify the iris information of the user and compares the iris information to the iris information in the database. The iris image is acquired by the biometric unit, feature information in the iris image is extracted, and the extracted feature information of the iris image is compared to the feature information of the iris image in the database to determine whether the feature information of the iris image exists in the database.

When the user verification information acquired by the acquiring module 102 is voiceprint information, the determining module 103 uses the voice recognition model to identify the voice information of the user and compares the voice information to the voice information in the database. The voice information is acquired by the biometric unit, feature information in the voice information is extracted, and the extracted feature information of the voice information is compared to the feature information of the voice information in the database to determine whether the feature information of the voice information exists in the database.

When the user authentication information acquired by the collection module 102 is the user's personal identification information, the determining module 103 compares the obtained user personal identification information to the user's personal identification information in the database and determines whether the user's personal identification information exists in the database.

The determining module 103 is further configured to determine whether the user is an administrator. When the determining module 103 determines that the user verification information exists in the database, the level of the user is searched in the database. The level of the user may be one of administrator, ordinary user, and advanced user.

In another embodiment, the serial number of the shared electronic device is acquired by the acquisition unit 13, and the serial number of the shared electronic device is compared to the serial number of the shared electronic device in the database, so that whether the serial number of the shared electronic device existing in the database is determined. The database stores the serial number of all of the shared electronic devices in the shared electronic device management device 100.

The first execution module 104 is configured to perform a corresponding operation according to the function instruction when the first preset rule is met.

In detail, when the determining module 103 determines that the verification information exists in the database according to the obtained verification information, the first execution module 104 performs a corresponding operation according to the function instruction received by the receiving module 101, wherein the function instruction includes any one of retrieving, depositing, and repairing the shared electronic device.

In one embodiment, when determining that the verification information exists in the database and the function instruction is for retrieving the shared electronic device, one shared electronic device is allocated according to a second preset rule, and the user verification information is linked to the serial number of the allocated shared electronic device. The shared electronic device management device 100 is controlled to open the storage compartment 141 corresponding to the allocated shared electronic device to allow the shared electronic device to be retrieved.

A method for allocating the shared electronic device according to the second preset rule may include: acquiring preset parameter information of each of the data charging interfaces 1411, sorting the preset parameter information according to the second preset rule, and allocating the shared electronic device according to a result of sorting the preset parameters. The preset parameter information may be sorted from small to large or from large to small. For example, the preset parameter is a charging current. The shared electronic device management device 100 acquires information of the charging current of all of the data charging interfaces 1411 and sorts the charging currents in order from small to large. The shared electronic device corresponding to the data charging interface 1411 with the smallest charging current is searched. The shared electronic device corresponding to the data charging interface 1411 with the smallest charging current has the most power. The fixing plate 1412 corresponding to the shared electronic device with the most power is searched, and the storage compartment 141 corresponding to the fixing plate 1412 is opened by the first execution module 104.

In another embodiment, the shared electronic devices include normal shared electronic devices and abnormal shared electronic devices. When the determining module 103 determines according to the user verification information that the level of the user is an administrator and the function instruction acquired by the input unit 11 is to retrieve the shared electronic device, the first execution module 104 searches for the corresponding shared electronic device according to the obtained input instruction, and opens the storage compartment 141 where the shared electronic device is located. The function instruction of the administrator includes retrieving the normal shared electronic device and/or retrieving the abnormal electronic device. For example, if the function instruction inputted by the administrator is retrieving the abnormal shared electronic device, the first execution module 104 searches for the abnormal shared electronic device according to the obtained input instruction and opens the storage compartment 141 where the searched shared electronic device is located.

In one embodiment, when the function instruction is to deposit the shared electronic device and the serial number of the shared electronic device is existed in the database, the user verification information corresponding to the serial number of the shared electronic device is searched, and usage statistics of the shared electronic device linked to the user verification information is recorded. The usage statistics include a retrieval time, a deposit time, and the like of the shared electronic device. The occupancy status of the storage unit 14 in the shared electronic device management device 100 is acquired by the sensing unit 1413. The sensing unit 1413 is an infrared sensor or a pressure sensor. For example, the infrared sensor emits infrared light to sense whether there is a shared electronic device located on the fixing plate 1412, and the pressure sensor located on the fixing plate 1412 senses whether the shared electronic device is located on the fixing plate 1412. When the sensing result is that there is no shared electronic device located on the fixing plate 1412, the sensing unit 1413 sends the sensing result to the first execution module 104, and the first execution module 104 opens the corresponding storage compartment 141, so that the shared electronic device can be placed inside the storage compartment 141. After the shared electronic device is placed on the fixing plate 1412 and the storage compartment 141 is closed, the sensing unit 1413 senses that the shared electronic device is located on the fixing plate 1412, and then sends a preset instruction to clear a personal use record of the shared electronic device through the data charging interface 1411. The personal usage record includes, but is not limited to, login information of the user, a call log, a web browsing record, and the like. In another embodiment, the personal usage record may be backed up to a server, so that when the user uses the shared electronic device again, the user can download the personal usage record through accessing the user account. When the shared electronic device is located in the storage compartment 141, the first execution module 104 controls the data charging interface 1411 to charge the shared electronic device. The first execution module 104 determines whether the power of the shared electronic device is full according to the change in current and voltage of the data charging interface 1411. If the shared electronic device is fully charged, the first execution module 104 controls the data charging interface 1411 to stop charging.

In one embodiment, when the function instruction includes repairing the shared electronic device, the user verification information corresponding to the serial number of the shared electronic device is searched, and usage statistics of the shared electronic device linked to the user verification information are recorded. The usage statistics include a retrieval time, a deposit time, and the like of the shared electronic device. The occupancy status of the storage unit 14 in the shared electronic device management device 100 is acquired by the sensing unit 1413. The sensing unit 1413 is an infrared sensor or a pressure sensor. For example, the infrared sensor emits infrared light to sense whether there is a shared electronic device located on the fixing plate 1412, and the pressure sensor located on the fixing plate 1412 senses whether the shared electronic device is located on the fixing plate 1412. When the sensing result is that there is no shared electronic device located on the fixing plate 1412, the sensing unit 1413 sends the sensing result to the first execution module 104, and the first execution module 104 opens the corresponding storage compartment 141, so that the shared electronic device can be placed inside the storage compartment 141. After the shared electronic device is placed on the fixing plate 1412 and the storage compartment 141 is closed, the sensing unit 1413 senses that the shared electronic device is located on the fixing plate 1412, and then sends a preset instruction to clear a personal use record of the shared electronic device through the data charging interface 1411. The personal usage record includes, but is not limited to, login information of the user, a call log, a web browsing record, and the like. In another embodiment, the personal usage record may be backed up to a server, so that when the user uses the shared electronic device again, the user can download the personal usage record through accessing the user account. When the shared electronic device is located in the storage compartment 141, the first execution module 104 controls the data charging interface 1411 to charge the shared electronic device. The first execution module 104 determines whether the power of the shared electronic device is full according to the change in current and voltage of the data charging interface 1411. If the shared electronic device is fully charged, the first execution module 104 controls the data charging interface 1411 to stop charging. The first execution module 104 determines, through the data charging interface 1411 according to the function instruction, whether the instruction for repairing the shared electronic device is a hardware maintenance item or a software maintenance item.

If the instruction for repairing is a software maintenance item, the shared electronic device management device 100 selects an inspection instruction corresponding to the software maintenance item, inspects the shared electronic device by using the inspection instruction, and saves an inspection result. The software maintenance item includes any one of a software troubleshooting item and a self-test maintenance item. The software troubleshooting item includes a touch screen failure, a failure to boot, no sound of a handset, and the like. For example, the software maintenance item acquired by the input unit 11 is a touch screen failure, and the first execution module 104 sends the inspection instruction corresponding to the touch screen failure through the data charging interface 1411 to inspect the shared electronic device, obtains an inspection result, and saves the inspection result. For example, the software maintenance item is a self-test maintenance item, and the first execution module 104 sends an inspection instruction corresponding to the self-test maintenance item through the data charging interface 1411 to inspect the shared electronic device, obtains an inspection result, and saves the inspection result.

If the instruction for repairing is a hardware maintenance item, the hardware maintenance item is displayed by the output unit 12 as a prompt. The hardware maintenance item may include a broken screen, screen bright spots, and the like.

The second execution module 105 is configured to output a prompt when the first preset rule is not met.

In detail, if the determining module 103 determines that the user verification information does not match the user information in the database and does not meet the first preset rule, then the second execution module 105 sends the prompt to the output unit 12. The prompt is output by the output unit 12 as a voice or text dialog box. For example, the prompt may be "the user verification information does not exist, please verify".

Figure 4:
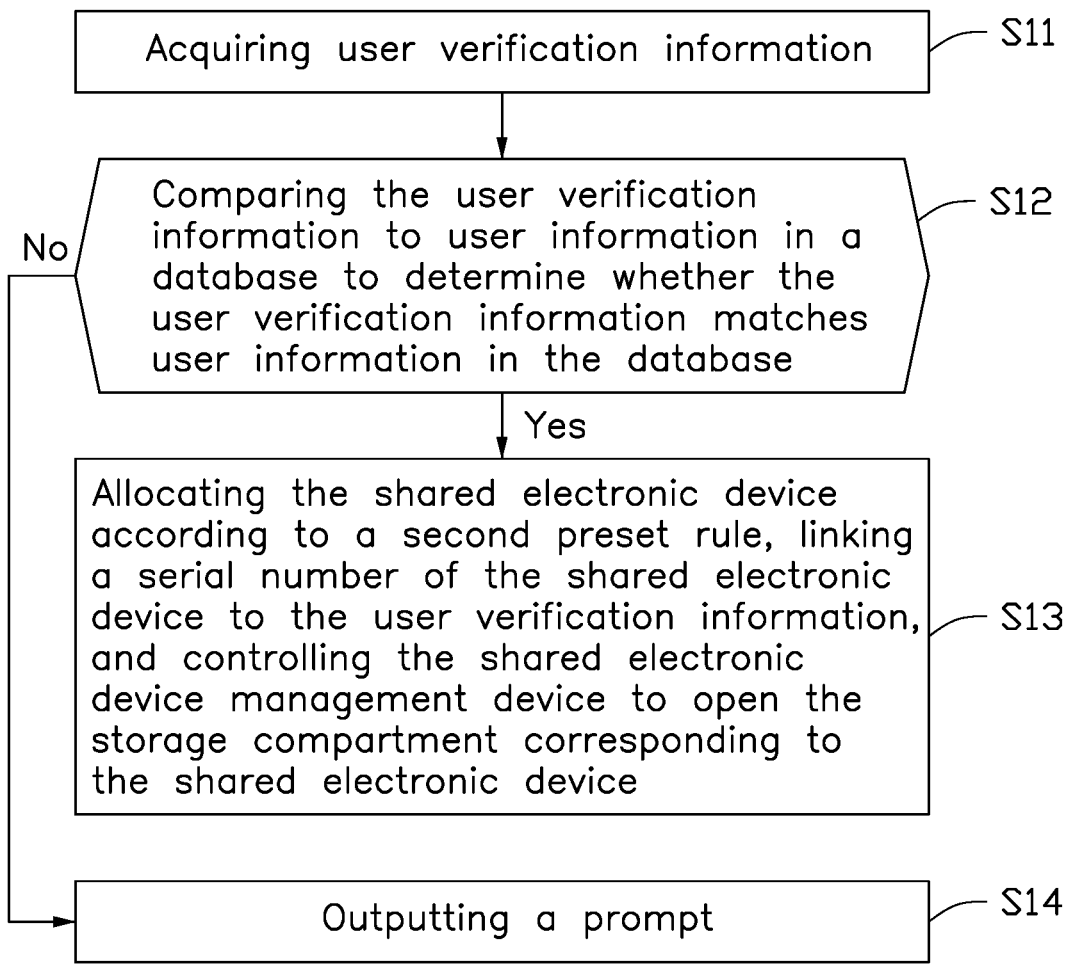
FIG. 4 is a flowchart of a method for acquiring a shared electronic device in a shared electronic device management method.

FIG. 4 shows a flowchart of a method for acquiring a shared electronic device in a shared electronic device management method. The order of blocks in the flowchart may be changed according to different requirements, and some blocks may be omitted.

In block S11, user verification information is acquired. The steps for acquiring the user verification information are described above and will not be described further.

In block S12, the user verification information is compared to user information in a database to determine whether the user verification information matches user information in the database. The steps of comparing the user verification information to the user information in the database are described above and will not be described further.

In block S13, if the user verification information matches user information in the database, the shared electronic device is allocated according to a second preset rule, a serial number of the shared electronic device is linked to the user verification information, and the shared electronic device management device 100 is controlled to open the storage compartment 141 corresponding to the shared electronic device for a user to retrieve the shared electronic device. The steps of allocating the shared electronic device are described above and will not be described further.

In block S14, if the user verification information does not match user information in the database, a prompt is output. The steps for outputting the prompt are described above and will not be described further.

Figure 5:
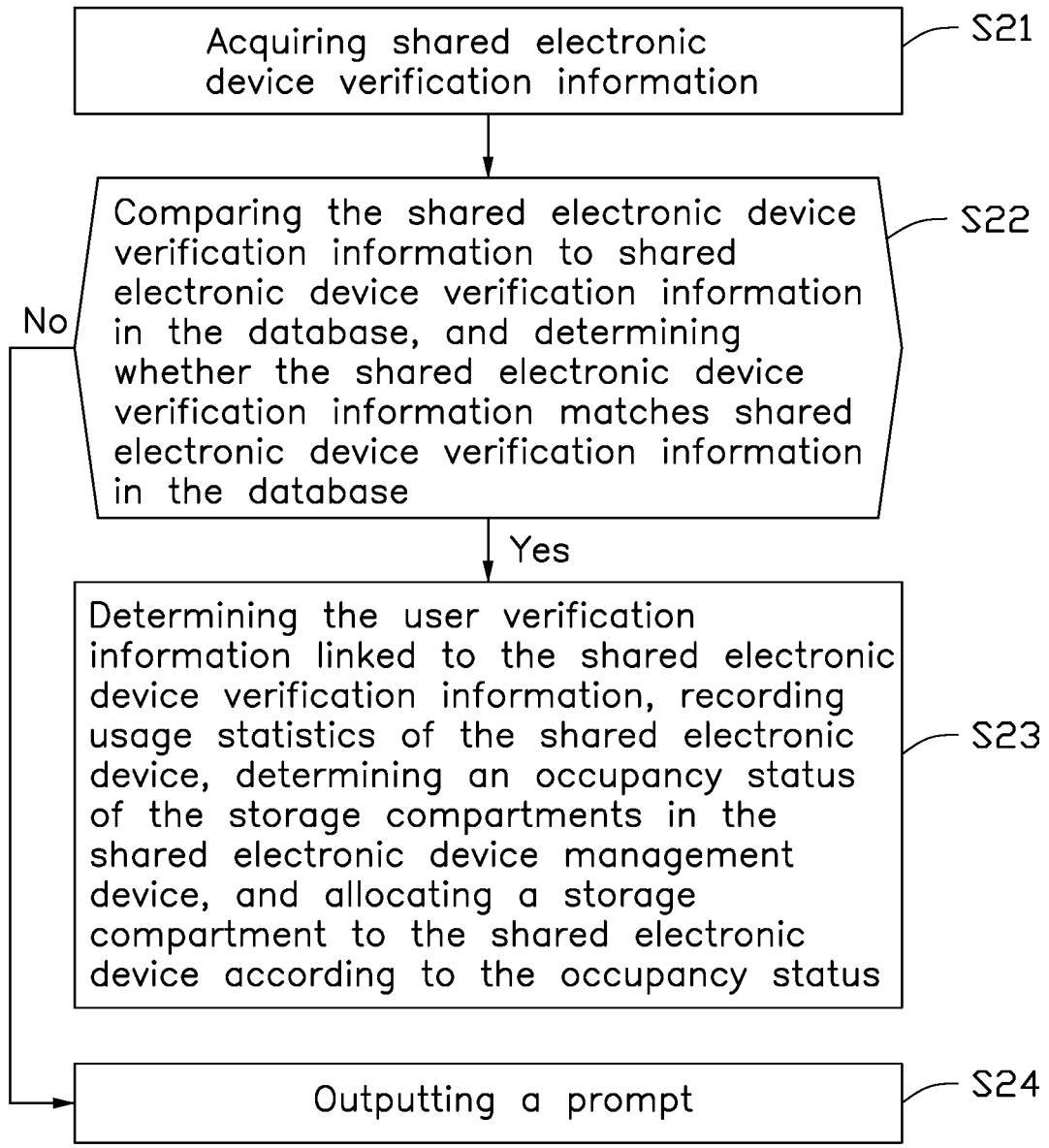
FIG. 5 is a flowchart of a method for depositing the shared electronic device in the shared electronic device management method.

FIG. 5 shows a flowchart of a method for depositing the shared electronic device in the shared electronic device management method. The order of blocks in the flowchart may be changed according to different requirements, and some blocks may be omitted.

In block S21, shared electronic device verification information is acquired. The steps of acquiring the shared electronic device verification information are described above and will not be described further.

In block S22, the shared electronic device verification information is compared to shared electronic device verification information in the database, and whether the shared electronic device verification information matching shared electronic device verification information in the database is determined. The steps of comparing the shared electronic device verification information to the shared electronic device verification information in the database and determining whether the shared electronic device verification information matching shared electronic device verification information in the database are described above and will not be described further.

In block S23, if the shared electronic device verification information matches shared electronic device verification information in the database, the user verification information linked to the shared electronic device verification information is determined, usage statistics of the shared electronic device are recorded, a state of occupancy of the storage compartments 141 in the shared electronic device management device 100 is determined through the sensing unit 1413, and a storage compartment 141 is allocated to the shared electronic device according to the occupancy status. The steps of determining the user verification information, recording the usage statistics, determining the state of occupancy of the storage compartments 141, and allocating the storage compartment 141 are described above and will not be described further.

In block S24, if the shared electronic device verification information does not match shared electronic device verification information in the database, a prompt is output. The steps of outputting the prompt are described above and will not be described further.

Figure 6:
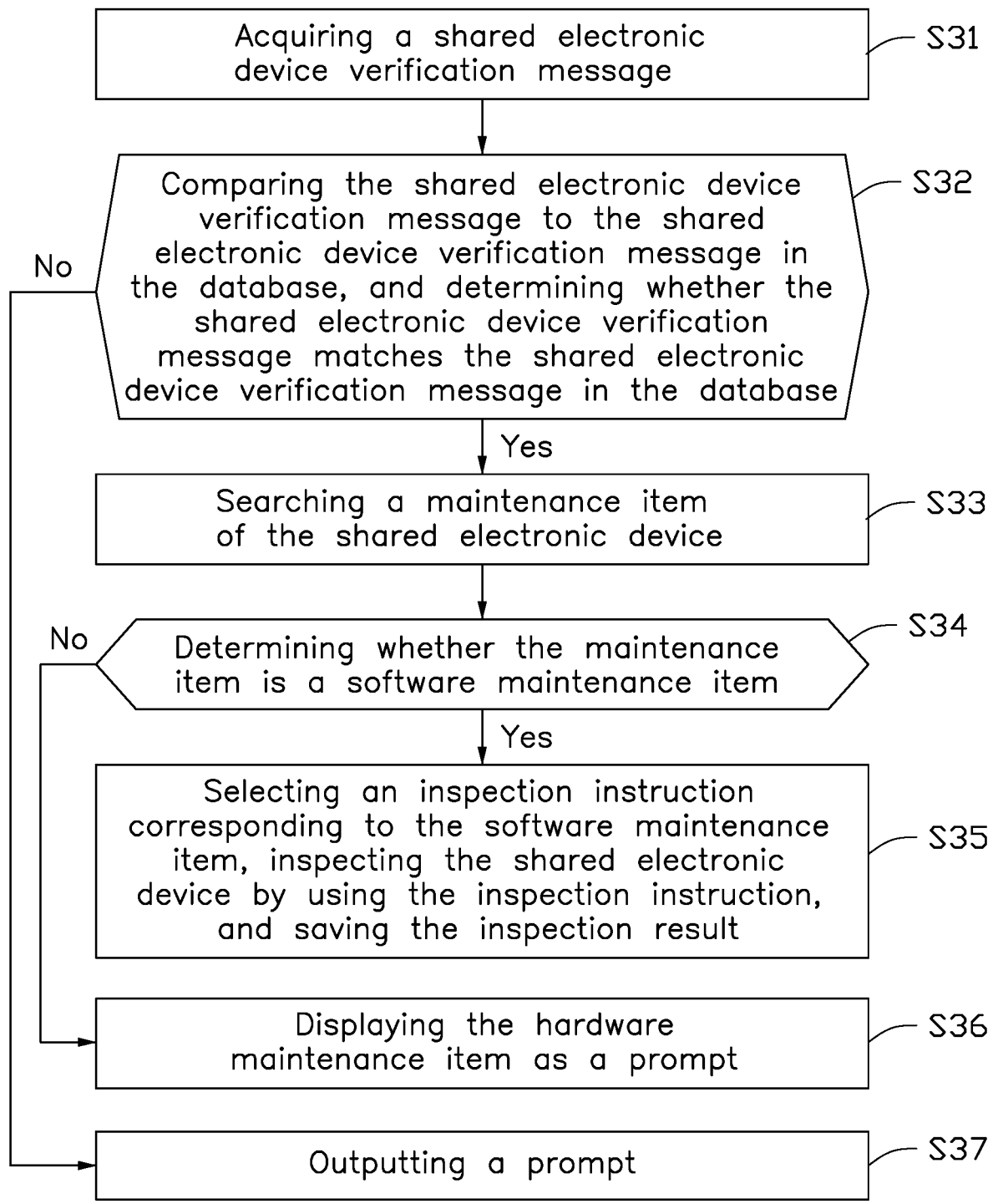
FIG. 6 is a flowchart of a method for repairing a shared electronic device in the shared electronic device management method.

FIG. 6 shows a flowchart of a method for repairing a shared electronic device in the shared electronic device management method. The order of blocks in the flowchart may be changed according to different requirements, and some blocks may be omitted.

In block S31, a shared electronic device verification information is acquired. The steps of acquiring the shared electronic device verification information are described above and will not be described further.

In block S32, the shared electronic device verification information is compared to the shared electronic device verification information in the database, and whether the shared electronic device verification information matching the shared electronic device verification information in the database is determined. The steps of comparing the shared electronic device verification information to the shared electronic device verification information in the database and determining whether the shared electronic device verification information matching the shared electronic device verification information in the database are described above and will not be described further.

In block S33, if the shared electronic device verification information matches the shared electronic device verification information in the database, the maintenance item of the shared electronic device is searched. The steps of searching the maintenance item are described above and will not be described further.

In block S34, whether the maintenance item being a software maintenance item is determined. The steps of determining whether the maintenance item of the shared electronic device is a software maintenance item are described above and will not be described further.

In block S35, if the maintenance item is a software maintenance item, an inspection instruction corresponding to the software maintenance item is selected, the shared electronic device is inspected by using the inspection instruction, and the inspection result is saved. The steps of selecting an inspection instruction, inspecting the shared electronic device, and saving the inspection result are described above and will not be described further.

In block S36, if the maintenance item is a hardware maintenance item, the hardware maintenance item is displayed as a prompt. The steps for displaying the prompt for the hardware maintenance item are described above and will not be described further.

In block S37, if the shared electronic device verification information does not match the shared electronic device verification information in the database, a prompt is output. The steps for outputting the prompt if the shared electronic device verification information does not match the shared electronic device verification information in the database are described above and will not be described further.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A shared electronic device management method implemented in a shared electronic device management device, the method comprising:
receiving a function instruction comprising retrieving a shared electronic device, depositing the shared electronic device, and repairing the shared electronic device;
obtaining verification information comprising user verification information and shared electronic device verification information;
comparing the obtained verification information to verification information in a database, and determining whether the obtained verification information meets a first preset condition;
implementing the function instruction if the obtained verification information meets the first preset condition; and
outputting a prompt if the obtained verification information does not meet the first preset condition,
wherein when the function instruction comprises retrieving the shared electronic device, the method further comprises:
obtaining the user verification information;
comparing the user verification information to the verification information in the database, and determining whether the user verification information matches the verification information in the database;
allocating the shared electronic device according to a second preset condition if the user verification information matches the verification information in the database, linking a serial number of the shared electronic device to the user verification information, and controlling the shared electronic device management device to open a storage compartment of the shared electronic device which has been allocated; and
outputting a prompt if the user verification information does not match the verification information in the database, wherein a method of allocating the shared electronic device according to the second preset condition comprises:
acquiring preset parameter information of each of a plurality of data charging interfaces;
sorting the preset parameter information according to a second preset rule; and allocating the shared electronic device according to a result of the preset parameter information of each of the plurality of data charging interfaces which have been sorted.

2. The shared electronic device management method of claim 1, wherein:
the user verification information comprises biometric information and user personal identification information; and
the biometric information comprises at least one of facial information, fingerprint information, iris information, and voiceprint information.

3. The shared electronic device management method of claim 2, wherein a method of obtaining the user verification information comprises:
obtaining user personal identification information; and
obtaining the biometric information comprising at least one of the facial information, the fingerprint information, the iris information, and the voiceprint information.

4. The shared electronic device management method of claim 1, wherein when the function instruction comprises depositing the shared electronic device, the method further comprises:
obtaining the shared electronic device verification information;
comparing the shared electronic device verification information to a shared electronic device verification information in the database, and determining whether the shared electronic device verification information matches the shared electronic device verification information in the database, wherein
if the shared electronic device verification information matches the shared electronic device verification information in the database, recording usage statistics of the shared electronic device, determining a state of occupancy of each storage compartment in the shared electronic device management device, and allocating a storage compartment to the shared electronic device according to the states of occupancy of the storage compartments; and
issuing a prompt if the shared electronic device verification information does not match the shared electronic device verification information in the database.

5. The shared electronic device management method of claim 4, wherein a method of recording the usage statistics of the shared electronic device comprises:
clearing a personal use record of the shared electronic device according to a preset instruction.

6. The shared electronic device management method of claim 4, the method further comprising:
electrically charging the shared electronic device when the shared electronic device is in the storage compartment.

7. The shared electronic device management method of claim 1, wherein when the function instruction comprises repairing the shared electronic device, the method further comprises:
obtaining the shared electronic device verification information;
comparing the shared electronic device verification information to shared electronic device verification information in the database, and determining whether the shared electronic device verification information matches shared electronic device verification information in the database;
obtaining a maintenance item input in the maintenance function instruction if the shared electronic device verification information matches the shared electronic device verification information in the database, the maintenance item comprising a software maintenance item or a hardware maintenance item, wherein
if the maintenance item is the software maintenance item, selecting an inspection instruction corresponding to the software maintenance item, inspecting the shared electronic device by using the inspection instruction, and saving an inspection result, the software maintenance item comprising any one of a software troubleshooting item and a self-test maintenance item, and
if the maintenance item is the hardware maintenance item, outputting a prompt.

8. A shared electronic device management device comprising:
an input unit that receives a function instruction;
an output unit that outputs a result of the function instruction;
a camera that acquires user verification information and shared electronic device verification information;
a storage unit comprising a plurality of storage compartments configured for accommodating a plurality of shared electronic devices;
a plurality of infrared sensors or pressure sensors respectively located in the plurality of storage compartments, each of the plurality of infrared sensors or pressure sensors sensing a state of occupancy of a corresponding one of the plurality of storage compartments;
a processor; and
a memory storing a plurality of instructions, which when executed by the processor, cause the processor to:
receive a function instruction comprising any one of retrieving a shared electronic device, depositing the shared electronic device, and repairing the shared electronic device;
obtain verification information, the verification information comprising a user verification information and shared electronic device verification information;
link the obtained verification information to verification information in a database, and determine whether the verification information meets a first preset condition;
implement the function instruction if the verification information meets the first preset condition; and
output a prompt if the verification information does not meet the first preset condition,
obtain the user verification information;
compare the user verification information to the verification information in the database, and determine whether the user verification information matches the verification information in the database;
allocate the shared electronic device according to a second preset condition if the user verification information matches the verification information in the database, link a serial number of the shared electronic device to the user verification information, and control the shared electronic device management device to open a storage compartment of the shared electronic device which has been allocated; and
output a prompt if the user verification information does not match the verification information in the database,
wherein a method of allocating the shared electronic device according to the second preset condition comprises: acquiring preset parameter information of each of a plurality of data charging interfaces; sorting the preset parameter information according to a second preset rule; and allocating the shared electronic device according to a result of the preset parameter information of each of the plurality of data charging interfaces which have been sorted.

9. The shared electronic device management device of claim 8, wherein:
the user verification information is user personal identification information obtained by the camera.

10. The shared electronic device management device of claim 8, wherein:
the user verification information is at least one of facial information, fingerprint information, iris information, and voiceprint information.

* * * * *